(12) United States Patent
Xu et al.

(10) Patent No.: US 12,468,469 B2
(45) Date of Patent: Nov. 11, 2025

(54) DATA PROCESSING METHOD AND SYSTEM, DEVICE, STORAGE SYSTEM AND MEDIUM BASED ON ACCESS UNITS WITH DIFFERENT DATA CAPACITIES

(71) Applicant: HANGZHOU ALICLOUD FEITIAN INFORMATION TECHNOLOGY CO., LTD., Hangzhou (CN)

(72) Inventors: Peng Xu, Hangzhou (CN); Zhongjie Wu, Beijing (CN); Yu Du, Shanghai (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/684,927

(22) PCT Filed: Nov. 4, 2022

(86) PCT No.: PCT/CN2022/129853
§ 371 (c)(1),
(2) Date: Feb. 20, 2024

(87) PCT Pub. No.: WO2023/116235
PCT Pub. Date: Jun. 29, 2023

(65) Prior Publication Data
US 2024/0354023 A1 Oct. 24, 2024

(30) Foreign Application Priority Data

Dec. 24, 2021 (CN) .......................... 202111600004.X

(51) Int. Cl.
*G06F 3/06* (2006.01)
(52) U.S. Cl.
CPC .......... *G06F 3/0644* (2013.01); *G06F 3/0604* (2013.01); *G06F 3/0679* (2013.01)

(58) Field of Classification Search
CPC .... G06F 3/0644; G06F 3/0604; G06F 3/0679; G06F 12/02
See application file for complete search history.

(56) References Cited

U.S. PATENT DOCUMENTS

| 11,036,407 B1 * | 6/2021 | Tikoo .................... G06F 3/0653 |
| 2012/0124276 A1 * | 5/2012 | Ahn ..................... G06F 12/0246 |
| | | 711/E12.008 |

(Continued)

FOREIGN PATENT DOCUMENTS

| CN | 104503710 A | 4/2015 |
| CN | 106802777 A | 6/2017 |

(Continued)

OTHER PUBLICATIONS

International Search Report English Translation PCT/CN2022/129853, Jan. 18, 2023, pp. 1-2.

*Primary Examiner* — Edward J Dudek, Jr.
(74) *Attorney, Agent, or Firm* — FisherBroyles, LLP; Susan M. Oiler

(57) ABSTRACT

Embodiments of the present disclosure provide a data processing method and system, a device, a storage system, and a medium. The data processing method includes: receiving a logic address corresponding to data to be processed; storing the logic address as a first access unit in a first storage pool; and in a case that the quantity of the stored first access units in the first storage pool meets a requirement, combining a plurality of first access units into a logic address group and storing the logic address group as a second access unit in a second storage pool so as to process the data based on the second access unit.

19 Claims, 4 Drawing Sheets

(56) References Cited

U.S. PATENT DOCUMENTS

| | | | |
|---|---|---|---|
| 2017/0031631 A1* | 2/2017 | Lee | G06F 3/0679 |
| 2017/0115884 A1* | 4/2017 | Bhalerao | G11C 11/5671 |
| 2019/0146705 A1* | 5/2019 | Lin | G06F 3/0659 |
| | | | 711/103 |
| 2019/0179698 A1* | 6/2019 | Liu | G06F 3/0679 |
| 2022/0066648 A1* | 3/2022 | Gunda | G11C 11/5635 |
| 2022/0155999 A1* | 5/2022 | Sikarwar | G06F 3/0659 |
| 2022/0187999 A1* | 6/2022 | Lam | G06F 3/0625 |

FOREIGN PATENT DOCUMENTS

| | | |
|---|---|---|
| CN | 106021159 A | 7/2020 |
| CN | 114297092 A | 4/2022 |

\* cited by examiner

| SLC BLK0 | | SLC BLK1 | | SLC BLK2 | SLC BLK3 |
|---|---|---|---|---|---|
| AU0 | Stream1_0 | AU8 | Stream1_2 | Stream1_4 | Stream1_6 |
| AU1 | Stream2_0 | AU9 | Stream2_2 | Stream2_4 | Stream2_6 |
| AU2 | Stream3_0 | AU10 | Stream3_2 | Stream3_4 | Stream3_6 |
| AU3 | Stream4_0 | AU11 | Stream4_2 | Stream4_4 | Stream4_6 |
| AU4 | Stream1_1 | AU12 | Stream1_3 | Stream1_5 | Stream1_7 |
| AU5 | Stream2_1 | AU13 | Stream2_3 | Stream2_5 | Stream2_7 |
| AU6 | Stream3_1 | AU14 | Stream3_3 | Stream3_5 | Stream3_7 |
| AU7 | Stream4_1 | AU15 | Stream4_3 | Stream4_5 | Stream4_7 |

401 sequentially combining logical addresses into logical address group according to sequential stream identifiers of logical addresses in first access unit, and taking logical address group as second access unit

402 storing second logical block constituted by second access unit into in second storage pool

Fig. 4

DATA PROCESSING METHOD AND SYSTEM, DEVICE, STORAGE SYSTEM AND MEDIUM BASED ON ACCESS UNITS WITH DIFFERENT DATA CAPACITIES

The present disclosure claims priority to Chinese Patent Application No. 202111600004. X, filed with the Chinese Patent Office on Dec. 24, 2021 and entitled "Data Processing Method and System, Device, Storage System and Medium," which is incorporated herein by reference in its entirety.

TECHNICAL FIELD

The present disclosure relates to the field of computer technologies, and particularly to a data processing method and system, a device, a storage system and a medium.

BACKGROUND

With the development of cloud storage technologies and demands, a capacity of a solid state drive (e.g., SSD) becomes larger and larger, and accordingly a larger cache needs to be provided for the solid state drive to store address mapping tables. The more caches are used, the higher the cost. Therefore, it is desirable to find a way to reduce the cost of the caches. In the related art, the quantity of secondary mapping tables (Logical Address to Physical Address (L2P)) managed by a Flash Translation Layer (FTL) can be reduced by introducing a Large Access Unit (Large AU) in the solid state drive. However, in a case that the Large Access Unit is read and rewritten, the entire large access unit (Large AU) is first read, merged with a new incoming data block, and then written back into the flash memory. A larger Write Amplification (WA) will be caused if the large access unit has valid data and the new incoming data block is smaller than the space of one large access unit. To address these problems, the related technologies use a cache to store by deploying a sequential stream to store the last large access unit. Generally, an application may open hundreds of logic blocks in parallel, and needs to occupy a lot of cache space to store the corresponding sequential streams; although a large space is used, in a case that data is directly written, a data writing manner with a small access unit size is still used, thereby causing the large write amplification. Therefore, it is desirable to provide an effective solution to the above problems.

SUMMARY

To solve or improve the problems existing in the related art, embodiments of the present disclosure provide a data processing method and system, a device, a storage system and a medium.

According to a first aspect of embodiments of the present disclosure, there is provided a data processing method, comprising: receiving a logical address corresponding to data to be processed; storing the logical address into a first storage pool as a first access unit; in a case that a quantity of the stored first access units in the first storage pool meets a requirement, combining a plurality of first access units into a logic address group, and storing the logic address group into a second storage pool as a second access unit so as to process the data based on the second access unit.

According to a second aspect of embodiments of the present disclosure, there is provided a data processing system, comprising: a first storage pool for receiving a logical address corresponding to data to be processed; storing the logical address as a first access unit; combining a plurality of first access units into a logic address group and storing the logic address group into a second storage pool as a second access unit in a case that a quantity of the stored first access units meets a requirement; and the second storage pool for storing the second access unit obtained by combining logical addresses in the plurality of first access units and processing data based on the second access unit.

According to a third aspect of embodiments of the present disclosure, there is provided an electronic device, comprising: a memory and a processor; the memory includes: a non-solid state drive and a solid state drive, wherein the non-solid state drive stores a data processing program, and the solid state drive is configured to store data to be processed; the processor is coupled to the memory and configured to execute the data processing program to: receive a logical address corresponding to data to be processed sent by a host; store the logical address into a first storage pool as a first access unit; and in a case that quantity of the stored first access units in the first storage pool meets a requirement, combine a plurality of first access units into a logic address group, and store the logic address group into a second storage pool as a second access unit so as to process the data based on the second access unit.

According to a fourth aspect of an embodiment of the present disclosure, there is provided a solid state drive-based storage system, comprising: a host and a solid state drive mounted on the host; the solid state drive is configured to receive a logical address corresponding to data to be processed sent by the host; store the logical address into a first storage pool as a first access unit; and combine a plurality of first access units into a logic address group and store the logic address group into a second storage pool as a second access unit so as to process the data based on the second access unit in a case that quantity of the stored first access units in the first storage pool meets a requirement.

According to a fifth aspect of embodiments of the present disclosure, there is provided a computer-readable medium having stored thereon at least one instruction, at least one program, a set of codes or a set of instructions, wherein the at least one instruction, the at least one program, the set of codes or the set of instructions is loaded and executed by a processor to implement the method according to the first aspect of embodiments of the present application.

According to technical solutions provided by embodiments of the present disclosure, in a case that a host has data to be stored on a solid state drive, a mapping table for managing the mapping relationship between the logical addresses and physical addresses of these data needs to be established. Upon storage, the logical addresses of data to be processed may be first stored into the first access unit in the first storage pool; in a case that the data amount of the logical addresses in the first storage pool meets a requirement (e.g., meets the requirement that the data amount of the logical addresses in the first storage pool is an integer multiple of a data capacity of the second access units in the second storage pool), the logical addresses in the plurality of first access units may be dumped to at least one second access unit. Since the density of flash memory cells in the second storage pool is greater than that in the first storage pool, i.e., the first access unit in the first storage pool has a smaller access unit and a mapping table, in a case that writing or reading of data is performed, the writing or reading may be implemented based on the first storage pool, whereas the second storage block in the second storage pool supports a larger access unit and a larger mapping table, and tries to avoid performing partial data writing or reading based on the second storage pool as much as possible, thereby effectively alleviating the problems such as write amplification and poor quality of service. Thus, the cost of hardware of the storage system can be reduced while ensuring the demands for data storage.

BRIEF DESCRIPTION OF THE DRAWINGS

To describe the technical solutions in the embodiments of the present disclosure more clearly, figures to be used to describe the embodiments will be introduced briefly. Obviously, the figures described hereunder illustrate some embodiments of the present disclosure. Those having ordinary skill in the art appreciate that other figures may also be obtained according to these figures without making any inventive efforts.

FIG. 3 is a schematic diagram of a first storage pool according to an embodiment of the present disclosure.

FIG. 4 is a flow chart of a combination storage method according to an embodiment of the present disclosure.

DETAILED DESCRIPTION

Figure 1:
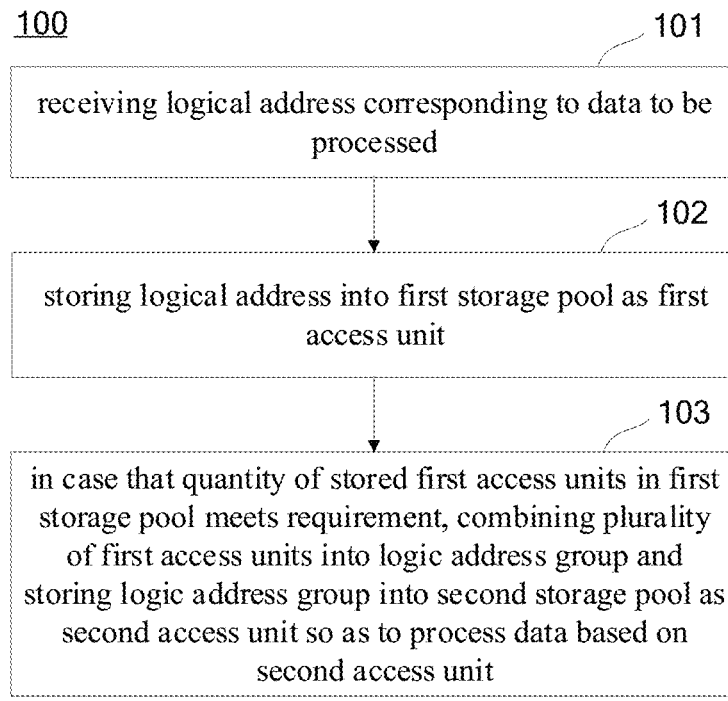
FIG. 1 is a flow chart of a data processing method according to an embodiment of the present disclosure.

To enable those skilled in the art to better understand solutions of the present disclosure, technical solutions in embodiments of the present disclosure will be described below clearly and completely with reference to figures in the embodiments of the present disclosure.

In some processes described in the description, claims and the above figures of the present disclosure, multiple operations occurring a particular order are included and may be executed not in the order occurring in the text herein or may be executed in parallel. The serial numbers of the operations, e.g., 101, 102, etc. are merely used to distinguish different operations, and the serial numbers themselves do not represent any order of execution. In addition, these processes may include more or fewer operations, and these operations may be performed in an order or in parallel. It should be noted that the terms such as "first" and "second" herein are intended to distinguish different messages, devices, modules, etc. and do not represent a sequential order, nor does they define that "first" and "second" are be of different types. Furthermore, the embodiments described below are only part of the embodiments of the present disclosure, not all embodiments. Based on the embodiments in the present disclosure, all the other embodiments obtained by those skilled in the art without making any inventive effort fall within the scope of protection of the present disclosure.

With the development of storage technologies, especially in a case where cloud storage technologies have been widely used, a problem about the cost of cloud storage devices has become increasingly prominent. Flash memory cells have undergone four innovations since the emergence of NAND Flash to today. Flash memory cells are classified into today's SLC, MLC, TLC, QLC flash memory cells according to the density of electronic cells arranged inside the NAND flash memory cells. The storage density of flash memory cells is greatly increased and the cost per bit is greatly reduced. On a high-capacity QLC disk, it is desirable to use a larger access unit to reduce the quantity of DRAMs used in in solid state drive (SSD) device. In a case that a large access unit is selected, certain drawbacks also arise, for example, the larger access unit may cause read modify write (RMW) leading to an extra write amplification (WA), thereby affecting the performance and lifetime of the solid state drive. Therefore, it is desirable to provide a method that can support the larger access unit for data processing while avoiding the adverse effects of write amplification. Illustration will be presented below by describing specific embodiments.

Firstly, main technical terms are defined as follows:

SSD (Solid State drive): solid state drives mainly include two types: one is constituted based on a flash memory cell (e.g., SLC, MLC, TLC, QLC or PLC) and the other is constituted based on the DRAM. The technical solution of the present disclosure employs an SSD based on the flash memory cell technology. The SLC (Single-Level Cell) has a long service life (theoretically erasable 100,000 times) due to its good stability and a high cost. The MLC is a dual-bit cell (each cell stores 2 pieces of data and has $2^2=4$ states, i.e., 00/01/10/11, and therefore has four different voltage states), and has a performance and a lifetime (theoretically erasable 10,000 times), and has a lower cost than the SLC. The TLC is a three-bit cell (each cell stores three pieces of data and has $2^3=8$ states and 8 different voltage states) with a low cost. The QLC and PLC will be specifically described in the following embodiments. The more data is stored in each cell, the higher the capacity per unit area.

AU (Access Unit): the access unit is a mapping management unit within a storage disk.

QOS (Quality of Service): parameters of the QoS mainly include transmission bandwidth, transmission delay and jitter, packet loss rate, etc.

WA (Write Amplification): write amplification usually describes a ratio of the amount of write into NANO to the amount of write of the user's data. This is because in a case that new data is written, if a controller of the solid state drive fails to find a page for writing the new data, a garbage collection process will be performed, and then a garbage collection mechanism will merge valid data in some data blocks into other data blocks, erase the invalid data from these data blocks, and write the new data into these data blocks. In the whole process, in addition to the user's data, some data merged from other data blocks actually need be written into the solid state drive, i.e., the data amount actually written is larger than the amount of the user's data. Therefore, the write amplification occurs.

FTL (Flash Translation Layer): the FTL is a collective term for solid state drive mapping management and related algorithms and is an LBA to PBA mapping. In a case that a file system sends an instruction to write data or update a particular logical page, the FTL actually writes the data to a different free physical page and updates the mapping table (associated data of LBA and PBA), and marks the "old data" contained on this page as "invalid" (the updated data has already been written to the new PBA, and the data of the old address is naturally invalid).

LBA (Logical Block Address): a logical block address is a general-purpose mechanism for indicating the position of data in a data storage device, and refers to a physical address of a certain data block or a data block directed to the certain physical address.

L2P (Logical to Physical): a logical address-to-physical address mapping table.

GC (Garbage Collection): by the garbage collection it is meant that the controller of the solid state drive first copies all valid data (e.g., data that is still in use) and writes all the valid data to a blank page of a different data area, erases all data cells in the current data area, and then starts writing new data to the data area from which all the data cells are just erased.

FIG. 1 is a flow chart of a data processing method 100 according to an embodiment of the present disclosure, specifically comprising the following step 101 to step 103. In an actual application scenario, a subject executing the method may be a storage device (e.g., a local storage device, a cloud storage device, etc.). The data processing method 100 will be described in detail below.

In step 101, a logical address corresponding to data to be processed is received.

In step 102, the logical address is stored into a first storage pool as a first access unit.

Then the process proceeds to step 103. In step 103, in a case that the quantity of the stored first access units in the first storage pool meets a requirement, a plurality of first access units are combined into a logic address group, and the logic address group is stored into a second storage pool as a second access unit so as to process the data based on the second access unit.

As used herein, the data to be processed may be data to be read from or written to a memory device. The data to be processed will be stored to a corresponding physical address; however, in a case that a process such as reading and writing is performed on the data to be processed, an operating system needs to search for a corresponding physical address by accessing a logical address in a first access unit corresponding to a mapping table to thereby achieve a corresponding data processing operation.

It should be noted that the first storage pool herein may be a SLC (Single-Level Cell) pool. The SLC stores 1 bit of data in each memory cell of the NAND flash memory. Whether the stored data indicates "0" or "1" is determined based on a Vth voltage threshold. Regarding writing (e.g., programming) to the NAND flash memory, the NAND flash memory is charged so that its voltage exceeds the voltage determination point, and the memory cell indicates 0-already programmed. If the NAND flash memory is not charged or the voltage threshold is below that voltage determination point, the memory cell indicates 1-already erased. Here, the first access unit is a mapping management unit in a measure unit of 4 KB in the SLC pool. In a case that a reading or writing operation is performed based on the first storage pool, the first access unit is taken as a basic operation unit; in a case that an erasing operation is performed, a logical block is taken as the basic operation unit.

The second storage pool may be a QLC (Quad-Level Cell) pool and/or a PLC (Penta-Level Cell) pool. The QLC stores 4 bits of data per memory cell and the PLC stores 5 bits of data per memory cell. The stored data is also determined based on the voltage threshold. That is, the data stream that can be stored by the second access unit is four or five times that of the first access unit (depending on the second access unit).

Although the second access unit of the second storage pool can store more data, in a case that mapping relationship management is performed, the second access unit supporting a larger data capacity is also managed as a basic unit. For example, in a read process, a random 4 KB read has no QoS penalty since the physical address of the 4 KB logical block may be calculated according to a starting physical position of the second access unit and its relative offset in the second access unit. In a case that an application updates 4 KB data in the second access unit, a read modify write (RMW) is required. The FTL needs to read the entire second access unit (N*4 KB), merge it with the incoming 4 KB data, and then write it back to the NAND flash memory. This means that N write amplifications (WA) are introduced. Therefore, in a case that the host needs to perform data processing on the data to be processed, the host implements the data processing based on the first storage pool. This is because the first access unit in the first storage pool takes 4 KB as a basic management unit, which is consistent with the size of the main stream logical block of the user's host, namely, 4 KB, which can well solve the problem caused by write amplification.

In practical application, the logical address is first stored into the first storage pool as the first access unit. In a case that the quantity of the stored first access units in the first storage pool meets a requirement, the plurality of first access units are combined into a logic address group, and the logic address group is stored into the second storage pool as the second access unit. In other words, the logical address of data to be processed is first stored in the first access unit in the first storage pool; in a case that the quantity of first access units can meet a storage requirement of the second access unit, physical addresses stored in the plurality of first access units are directly dumped to the second access units. In this combined mode based on the first storage pool and the second storage pool, after a small number of high-cost first storage pools are input, occurrence of problems such as write amplification and failure of quality of service (QOS) to reach the standard are alleviated, and the advantage of giving full play to the second access unit supporting the management of a larger amount of data at a low cost can be realized.

Figure 2:
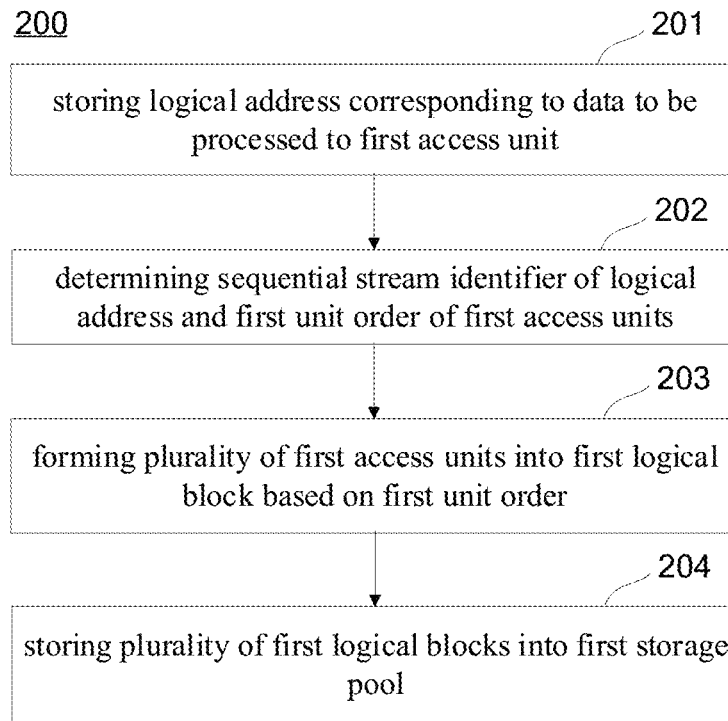
FIG. 2 is a flow chart of a method of performing storage based on a first storage pool according to an embodiment of the present disclosure.

FIG. 2 is a flow chart of a method of performing storage based on a first storage pool according to an embodiment of the present disclosure. As shown in FIG. 2, the storing the logical address as a first access unit into a first storage pool specifically includes the following steps 201 to 204. The method 200 of performing storage based on the first storage pool will be described in detail below.

In step 201, a logical address corresponding to the data to be processed is stored to the first access unit.

In step 202, a sequential stream identifier of the logical address and a first unit order of the first access units is determined.

Then, the process proceeds to step 203. In step 203, the plurality of first access units are formed into a first logical block based on the first unit order.

Then, the process proceeds to step 204. In step 204, the plurality of first logical blocks are stored into the first storage pool.

It should be noted that as stated in step 201, after storing the logical address corresponding to the data to be processed into the first access unit, the method further includes: determining a mapping relationship between a physical address of the data to be processed and the logical address; and based on the mapping relationship, generating a first mapping table corresponding to the first access unit.

In practical application, dumping the logical address in the first access unit to the second access unit does not mean simply moving valid data from the first storage pool to the second storage pool, but requires maintaining a valid logical block for each data flow in the first storage pool. The first mapping table of the first logical block in the first storage pool is still managed with a granularity of 4 KB. In order to facilitate data management, in a case that the first access units are stored, they need to be stored into the respective first logical blocks in the first unit order. Furthermore, the first storage pool in which the logical addresses are sequentially stored and composed of a plurality of first logical blocks can be obtained. In order to control the cost, the quantity of first storage pools is limited, and in a case that a certain condition is reached, logical addresses in the first storage pool may be dumped into the lower-cost second storage pool according to the access units or logical blocks.

To facilitate understanding, specific examples are given below.

FIG. 3 is a schematic diagram of a first storage pool according to an embodiment of the present disclosure. As shown in FIG. 3, assume that the first storage pool has four logical blocks, SLC BLK0, SLC BLK1, SLC BLK2 and SLC BLK3. Each logical block includes a plurality of first access units AUs. For example, in SLC BLK0 there are first access units AU0, AU1, AU2, AU3, AU4, AU5, AU6 and AU7 respectively; in SLC BLK1 there are first access units AU8, AU9, AU10, AU11, AU12, AU13, AU14 and AU15 respectively.

The logical addresses in the first access units in the SLC BLK0 are also respectively marked with corresponding sequential stream identifiers, which are stream1_0, stream2_0, stream3_0, stream4_0, stream1_1, stream2_1, stream3_1 and stream4_1, respectively; the logical addresses in the first access units in the SLC BLK1 are also respectively marked with corresponding sequential stream identifiers, which are stream1_2, stream2_2, stream3_2, stream4_2, stream1_3, stream2_3, stream3_3 and stream4_3, respectively. In one embodiment, the first access units (as shown in FIG. 3) in each of SLC BLK2 and SLC BLK3 will not be described in detail here. The plurality of first access units in each first logical block are stored in the first unit order. Moreover, the logical addresses between the plurality of first logical blocks also comply with an order rule of the sequential stream identifiers, so as to facilitate subsequent dumping of the logical addresses according to the sequential streams.

In one or more embodiments of the present disclosure, in a case that the quantity of the stored first access units in the first storage pool meets the requirement, combining the plurality of first access units into the logic address group and storing the logic address group as the second access unit into the second storage pool to process the data based on the second access unit includes: if the data amount of the logical addresses in the first storage pool is greater than a first threshold; or if the data amount of the first access unit is an integer multiple of a data capacity of one of the second access units, combining a plurality of first access units into a logical address group and storing the logical address group into the second storage pool as the second access unit so as to process data based on the second access unit.

As stated above, the second access unit supports storage of a greater data capacity. In order to alleviate the problems such as write amplification caused by reading data from or writing data to the second access unit, a limiting requirement may be set for the second access unit corresponding to the logic address group combined from the logical addresses in the first access unit. The requirement here may include multiple types of requirements: a first threshold for performing a combination process on the logical addresses may be set for the first storage pool, i.e., the first threshold is the data amount of logical addresses in the first storage pool or the quantity of the first access units generated in the first storage pool and containing the logical addresses. The first threshold may not be set, and in a case that the quantity of first access units or the data amount of the logical addresses is an integer multiple of the data capacity of at least one second access unit, the logical addresses in the first storage pool are dumped to the second access units; this manner may reduce the demand on the data capacity of the first storage pool, and is equivalent to achieving real-time dumping. As stated above, in a case that data read or write is performed in the second storage pool, the read or write operation is performed with the second access unit as a minimum basic unit; assuming that the data capacity of the second access unit is N times that of the first access unit, after N first access units in the first storage pool store logical addresses, the logical addresses in the N first access units may be combined into one second access unit. After the dumping is completed, the logical addresses in the plurality of first access units in the first storage pool fail, so that an erasing process may be performed thereon, and thereby, the quantity of access units is reduced to one-$N^{th}$ in the original first storage pool; in addition, the quantity of first mapping tables corresponding to the first access units is also reduced to one-$N^{th}$ in the original first storage pool, which can significantly save the storage space.

For example, it is assumed that the first storage pool has a size of 512 KB and includes 16 first logical blocks, each of the first logical blocks includes 8 first access units, and each of the first access unit is 4 KB. It is assumed that the second storage pool has a size of 2048 KB, and contains 16 second logical blocks, each of the second logical blocks includes 8 second access units, and each of the second access units is 16 KB. It can be seen that the data capacity of the second access units is four times that of the first access units. In other words, logical addresses stored by four first access units are needed to be combined into one second access unit. If the first threshold is set to 256 KB, in a case that there are 64 first access units all storing logical addresses in the first storage pool, the logical addresses in the 64 first access units will be combined and stored in the corresponding 16 second access units. It is also possible to perform the combined storage without setting the first threshold. Specifically, in a case that there are four first access units all storing logical addresses in the first storage pool, i.e., the data amount in the first access unit is 1 times the data capacity (16 KB) of the second access unit, the logical addresses in the four first access units may be combined into the second access unit.

In addition, whether to transfer may also be determined based on the relationship between the quantity of first logical blocks and the second logical blocks. Specifically, if the first threshold is set to 256 KB, in a case that there are 16 first logical blocks all storing logical addresses in the first storage pool, the logical addresses in the 16 first logical blocks may be combined and stored in the second access units of the corresponding 4 second logical blocks.

FIG. 4 is a flow chart of a combination storage method 400 according to an embodiment of the present disclosure. As shown in FIG. 4, combining a plurality of first access units into a logical address group, and storing the logical address group as a second access unit into a second storage pool specifically includes the following steps 401 to 402. The combination storage method 400 will be described in detail below.

In step 401, the logical addresses are sequentially combined into the logical address groups according to the sequential stream identifiers of the logical addresses in the first access units, and the logical address groups are taken as the second access units.

Then, the process proceeds to step 402. In step 402, a second logical block included of the second access unit is stored in the second storage pool.

In a case that the storage is performed according to the sequential stream identifiers, it can be ensured that the physical addresses of data are adjacent; in a case that the storage device performs data deletion with a block as a unit, the corresponding garbage logical blocks also converge, so that the problem of write amplification can be alleviated. The sequential stream identifiers herein may be marked in the order of the data to be processed provided by the host. Specifically, a garbage collection (GC) will select a sequential stream from the first storage pool, read a plurality of logical addresses in a plurality of first access units from the first storage pool and program them into the second storage pool (e.g., QLC/PLC).

Figures 5, 6:
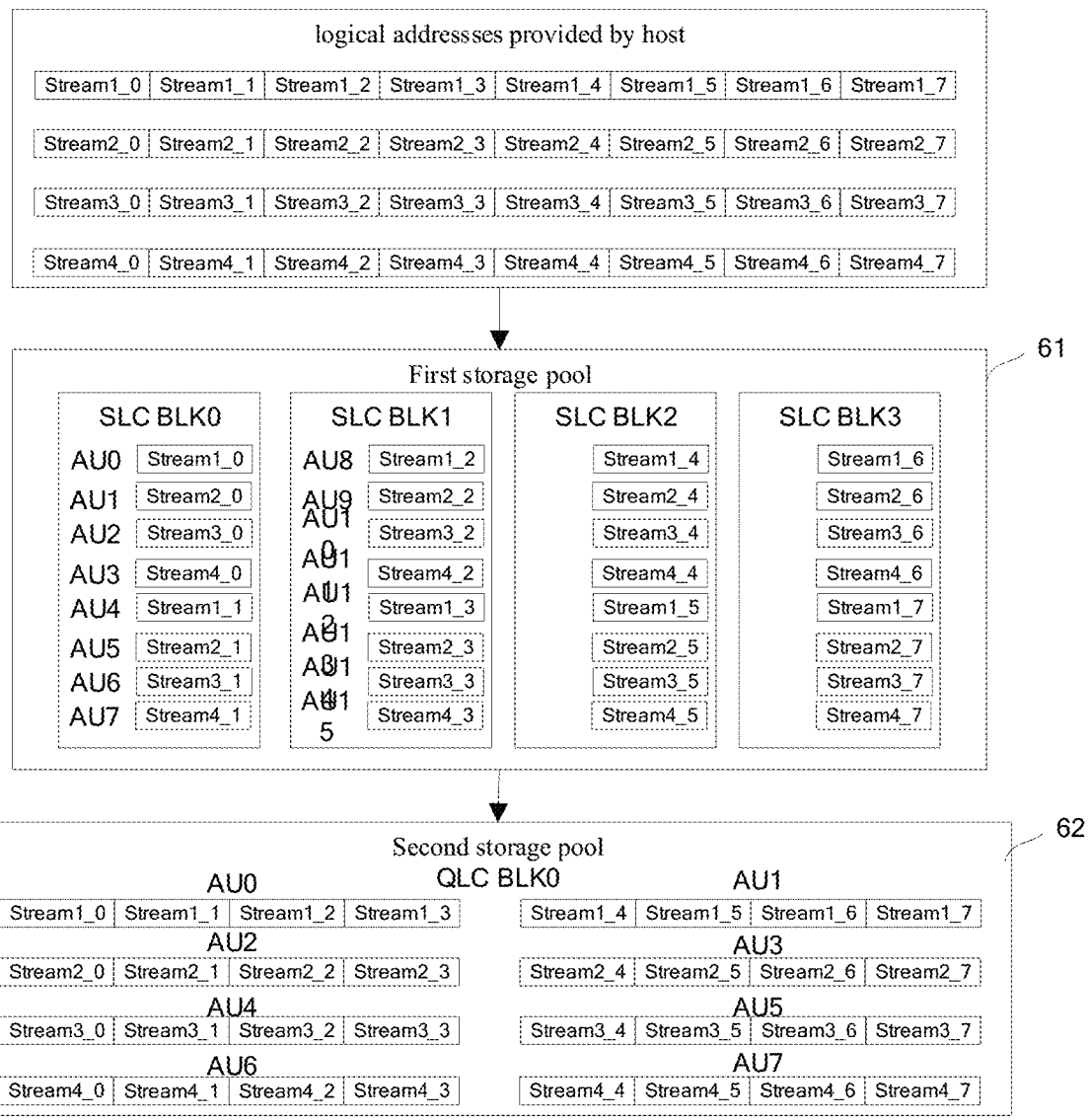
FIG. 5 is a structural schematic diagram of a second storage pool according to an embodiment of the present disclosure.
FIG. 6 is a structural schematic diagram of a data processing system according to an embodiment of the present disclosure.

FIG. 5 shows a structural schematic diagram of a second storage pool according to an embodiment of the present disclosure. As shown in FIG. 5, it is assumed that the second storage pool has one logical block, QLC BLK0. The logical block includes a plurality of second access units AU, for example, AU0, AU1, AU2, AU3, AU4, AU5, AU6 and AU7. As described above, the data capacity of the second access unit is an integer multiple that of the first access unit (in the present embodiment, the data capacity of the second access unit is 4 times that of first access unit). In the second access unit AU0, the contained logical addresses and sequential stream identifiers corresponding thereto are: stream1_0, stream1_1, stream1_2, and stream1_3; in the second access unit AU1, the contained logical addresses and corresponding sequential stream identifiers corresponding thereto are: stream1_4, stream1_5, stream1_6 and stream1_7. It can be seen that the logic addresses in the second access unit AU0 are continuous according to the sequential stream identifiers, and the sequential stream identifiers between the second access units AU0 and AU1 are also continuous. The combination processing is continued according to the sequential stream identifiers in the same combination processing manner as AU0 and AU1 to obtain AU2, AU3, AU4, AU5, AU6 and AU7. The logical addresses and their corresponding sequential stream identifiers in AU2, AU3, AU4, AU5, AU6 and AU7 are as shown in FIG. 5, and will not be described in detail here.

In one or more embodiments of the present disclosure, the sequentially combining the logical addresses into logical address groups according to the sequential stream identifiers of the logical addresses in the first access units, and taking the logical address groups as the second access units includes: if a plurality of first access units are respectively stored in a plurality of first logical blocks, respectively obtaining the sequential stream identifiers of the logical addresses in the plurality of first logical units; grouping and combining the logical addresses according to the data capacity of the second access unit based on an order of the sequential stream identifiers to generate the second access unit.

As shown in FIG. 3, in the first logical block, the first access units are grouped and stored in a first unit order. As shown in FIG. 5, in the second logical block, the second access units are stored according to the sequential stream identifiers. It can be seen that the first unit order is different from the sequential stream identifiers. There might be a case as shown in FIG. 3 in which a plurality of logical addresses with continuous sequential stream identifiers are allocated to a plurality of first logical blocks. Therefore, in a case that the logical addresses in the first access units are combined into the second access units using the garbage collection (GC), the sequential stream identifiers respectively corresponding to the logical addresses in the plurality of first logical blocks need to be obtained. For example, the logical addresses in four first logical blocks need to be combined into one second logical block, the sequential stream identifiers of all the logical addresses in the four first logical blocks are obtained by using the garbage collection, and after the logical addresses are sorted according to the sequential stream identifiers, the logical addresses are grouped and combined in one time according to the data capacities of the second access units to obtain eight second access units as shown in FIG. 5. Furthermore, the 8 second access units are stored into the second storage pool as a second logical block.

In one or more embodiments of the present disclosure, after storing the second logical block constituted by the second access units into the second storage pool, the method further includes: determining a plurality of first mapping tables corresponding to the plurality of first access units for combining the second access units; deleting the plurality of first mapping tables from the first storage unit pool; and generating one second mapping table corresponding to the second access unit based on the mapping relationship contained in the plurality of first mapping tables.

It should be noted that the mapping tables of physical addresses and logical addresses is established based on the access units. This means that in a case that the mapping tables are established for data to be processed of the data amount, the larger the data capacity of the access unit is, the less mapping tables are needed, the less flash memory storage space the mapping tables need to occupy. Therefore, in a case that the storage of logical addresses is performed based on the first storage pool, the data amount of the mapping tables generated based on the first access units is large. The data amount will occupy a large amount of storage space in the flash memory, which means that a high cost needs to be paid to provide more storage space to store the mapping tables. Therefore, in the technical solution of the present disclosure, after a combination operation on a logical address in the first access units is completed, a storage space where the first access units are located and a storage space of mapping tables corresponding thereto need to be recovered in order to release more storage space for storing logical addresses and mapping tables of data to be processed newly provided by the host.

In one or more embodiments of the present disclosure, the deleting the plurality of first mapping tables from the first storage unit pool includes: determining a first logical block marked as a deleted state and the corresponding plurality of first mapping tables; and determining a recoverable first logical block in the first storage pool according to the first logical block marked as the deleted state and the corresponding plurality of first mapping tables and performing a garbage collection on the recoverable first logical block so as to delete the plurality of first mapping tables from the first storage unit pool.

While erasing of the first mapping tables is completed, a corresponding second mapping table also needs to be established for the second access unit. As stated above, assuming that the first access unit is 4 KB and the second access unit is 16 KB, after the combination operation on a logical address of 256 KB is completed the quantity of mapping tables is also reduced from 64 to 16, the storage space occupied by the mapping tables is reduced to one fourth of the original storage space, and convergence on the garbage logical blocks and corresponding mapping tables is implemented while garbage collection is performed.

To help understand the embodiments of the present disclosure, a garbage collection process is described below. For solid state drives, the garbage collection (GC) refers to a process of transferring currently-stored data to other flash memory positions and thoroughly deleting some useless data. As described above, data is written in units of access units, but data needs to be deleted in units of blocks. Therefore, in order to delete useless data, the solid state drive first needs to copy and paste useful data contained in a block into a page in a new block, so that the useless data contained in the original block can be deleted in the units of blocks. New data can only be written after the deletion and cannot be written before erasure.

In a case that a file is deleted from the operating system, the operating system simply makes a mark its internal file table to indicate that the file has been deleted (indicating that the corresponding first logical blocks and the plurality of first mapping tables are also marked as deleted). Since a NAND flash memory device cannot overwrite existing data, currently invalid data still remains on the solid state drive SSD. As such, a lot of failed data (including failed logical addresses and corresponding mapping tables) are caused. In order to improve the utilization efficiency of the solid state drive, it is necessary to perform "garbage collection" in time, and erase the logical addresses and their corresponding mapping tables from the first access units.

In one or more embodiments of the present disclosure, the method further includes: if the data amount of the logical addresses in the first storage pool is smaller than a data capacity of the second access unit, waiting for the host to send a logical address corresponding to new data to be processed.

As stated above, the second access unit serves as a minimum read/write unit in the second storage pool. If the data amount in the first storage pool is smaller than the data capacity of the second access unit, writing a logical address into the second access unit will cause the second access unit not to be written to full, thereby causing the idling and waste of the storage space. Therefore, the combination operation of the logical addresses can be performed only in a case that it is ensured that the data amount of logical addresses in the first storage pool at least meets the data capacity of one second access unit. Otherwise, it will continue to wait for the host to send the logical address corresponding to new data to be processed.

For example, suppose that the data amount of logical addresses in the current first storage pool is 516 KB and suppose that these logical addresses are stored in 16 whole first logical blocks and one first logical block storing 4 KB logical addresses, each first logical block includes 8 first access units, each first access unit stores 4 KB logical addresses. Therefore, in a case that the combination process is performed on the first access units, the logical addresses in 16 whole first access units are combined to obtain 4 whole second access units. However, since there are still 1 KB logical addresses which neither satisfy the data capacity of the first access units nor satisfy the data capacity of the second access units, the last 1 KB logical addresses cannot be combined temporarily, and have to continue to wait for new logical addresses to be stored in the first access units and then be combined with the new logic addresses into the second access units.

It should be noted that the flash memory cell density of the second storage pool is greater than that of the first storage pool. The data capacity of the second logical block is greater than that of the first logical block, and the data capacity of the second access unit is greater than that of the first access unit. Furthermore, the first access units and the corresponding first mapping table are enabled to achieve convergence after completion of the combination processing of the logical addresses.

Based on the same idea, embodiments of the present disclosure further provide a data processing system 600. FIG. 6 is a structural schematic diagram of a data processing system 600 according to an embodiment of the present disclosure. The data processing system 600 is a system for a solid state drive to perform data read/write processing. As shown in FIG. 6, the system includes:

a first storage pool 61 for receiving a logical address corresponding to data to be processed; storing the logical address as a first access unit; in a case that quantity of the stored first access units meets a requirement, combining a plurality of first access units into a logic address group and storing the logic address group into a second storage pool as a second access unit.

The second storage pool 62 is used for storing the second access unit obtained by combining logical addresses in the plurality of first access units and processing data based on the second access unit.

To help understand the working principles of the above system, specific examples are taken for illustration. As shown in FIG. 6, the host provides a plurality of logical addresses. First, the logic addresses are stored into four first logical blocks in the first storage pool in a first unit order. Since the quantity of logical addresses in the first storage pool can satisfy the data capacity of one second logical block at this time, the logical addresses will be combined into the second logical block according to the sequential stream identifiers corresponding to the logical addresses.

Figure 7:
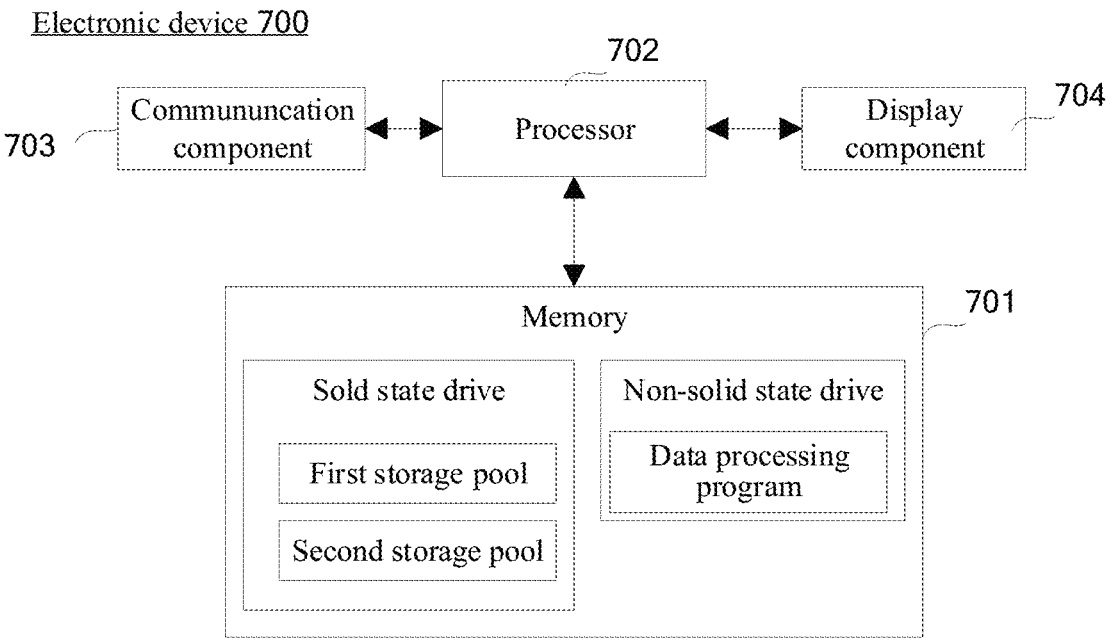
FIG. 7 is a structural schematic diagram of an electronic device according to an embodiment of the present disclosure.

An embodiment of the present disclosure further provides an electronic device. FIG. 7 shows a structural schematic diagram of an electronic device 700 according to an embodiment of the present disclosure. The electronic device 700 includes a memory 701, a processor 702, and a communication component 703. The memory 701 includes: a non-solid state drive and a solid state drive, wherein a data processing program is stored in the non-solid state drive, and the solid state drive is configured to store a logical address corresponding to the data to be processed.

The processor is coupled to the memory and used to execute the data processing program to: receive a logical address corresponding to data to be processed sent by the host; store the logical address into a first storage pool as a first access unit; in a case that the quantity of the stored first access units in the first storage pool meets a requirement, combine a plurality of first access units into a logic address group, and store the logic address group into a second storage pool as a second access unit so as to process the data based on the second access unit.

The memory 701 may be configured to store various other data to support operations on the electronic device. Examples of such data include instructions for any application or method operated on the electronic device. The memory may be implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

Furthermore, the processor 702 in the present embodiment may specifically be: a programmable switch processing chip in which is configured a data replication engine capable of replicating the received data.

When executing programs in the memory, the processor 702 may perform other functions in addition to the above functions. For particulars, please refer to the depictions of the above embodiments. Furthermore, as shown in FIG. 7, the electronic device further includes other components such as a display component 704.

Figure 8:
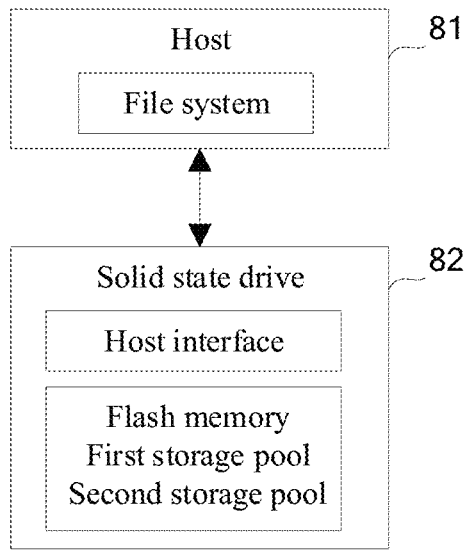
FIG. 8 is a structural schematic diagram of a solid state drive-based storage system according to an embodiment of the present disclosure.

Based on the same idea, the embodiments of the present disclosure further provide a solid state drive-based storage system. FIG. 8 shows a structural schematic structure of a solid state drive-based storage system 800 according to an embodiment of the present disclosure. The storage system 800 includes: a host 81 and a solid state drive 82 mounted on the host; the solid state drive 82 is used for receiving a logical address corresponding to data to be processed sent by the host; storing the logical address into a first storage pool as a first access unit; and in a case that the quantity of the stored first access units in the first storage pool meets a requirement, combining a plurality of first access units into a logic address group, and storing the logic address group into a second storage pool as a second access unit so as to process the data based on the second access unit.

receive a logical address corresponding to data to be processed; store the logical address into a first storage pool as a first access unit; in a case that the quantity of the stored first access units in the first storage pool meets a requirement, combine a plurality of first access units into a logic address group, and store the logic address group into a second storage pool as a second access unit so as to process the data based on the second access unit.

In one embodiment, the solid state drive 82 is further configured for storing a logical address corresponding to the data to be processed to the first access unit; determining a sequential stream identifier of the logical address and a first unit order of the first access units; forming the plurality of first access units into a first logical block based on the first unit order; and storing a plurality of first logical blocks into the first storage pool.

In one embodiment, the solid state drive 82 is further configured for determining a mapping relationship between a physical address of the data to be processed and the logical address; and based on the mapping relationship, generating a first mapping table corresponding to the first access unit.

In one embodiment, the solid state drive 82 is further configured for, if the data amount of the logical addresses in the first storage pool is greater than a first threshold; or if the data amount of the first access unit is an integer multiple of a data capacity of one of the second access units, combining a plurality of first access units into a logical address group, and storing the logical address group into a second storage pool as a second access unit so as to process data based on the second access unit.

In one embodiment, the solid state drive 82 is further configured for sequentially combining the logical addresses into a second access unit according to the sequential stream identifiers of the logical addresses in the first access unit; storing a second logical block constituted by the second access unit into in the second storage pool.

In one embodiment, the solid state drive 82 is further configured for, if a plurality of first access units are respectively stored in a plurality of first logical blocks, respectively obtaining the sequential stream identifiers of the logical addresses in the plurality of first logical units; grouping and combining the logical addresses according to the data capacity of the second access unit based on an order of the sequential stream identifiers; generate the second access unit.

In one embodiment, the solid state drive 82 is further configured for determining a plurality of first mapping tables corresponding to the plurality of first access units for combining the second access units; deleting the plurality of first mapping tables from the first storage unit pool; and generating one second mapping table corresponding to the second access units based on the mapping relationship contained in the plurality of first mapping tables.

In one embodiment, the solid state drive 82 is further configured for determining a first logical block marked as a deleted state and the corresponding plurality of first mapping tables; and determining a recoverable first logical block in the first storage pool according to the first logical block marked as the deleted state and the corresponding plurality of first mapping tables and performing a garbage collection on the recoverable first logical block so as to delete the plurality of first mapping tables from the first storage unit pool.

In one embodiment, the solid state drive 82 is further configured for, if the data amount of the logical addresses in the first storage pool is smaller than a data capacity of the second access unit, waiting for the host to send a logical address corresponding to new data to be processed.

In one embodiment, a flash memory cell density of the second storage pool in the solid state drive 82 is greater than that of the first storage pool.

Embodiments of the present disclosure further provide a computer-readable medium having stored thereon at least one instruction, at least one program, a set of codes or a set of instructions, wherein the at least one instruction, the at least one program, the set of codes or the set of instructions is loaded and executed by a processor to implement the methods shown in FIG. 1 through FIG. 5.

Based on the above embodiments, in a case that a host has data to be stored on a solid state drive, a mapping table for managing the mapping relationship between the logical addresses and physical addresses of these data needs to be established. Upon storage, the logical addresses of data to be processed may be first stored into the first access unit in the first storage pool; in a case that the data amount of the logical addresses in the first storage pool meets a requirement (e.g., meets the requirement that the data amount of the logical addresses in the first storage pool is an integer multiple of a data capacity of the second access units in the second storage pool), the logical addresses in the plurality of first access units may be dumped to at least one second access unit. Since the density of flash memory cells in the second storage pool is greater than that in the first storage pool, i.e., the first access unit in the first storage pool has a smaller access unit and a mapping table, in a case that writing or reading of data is performed, the writing or reading may be implemented based on the first storage pool, whereas the second storage block in the second storage pool supports a larger access unit and a larger mapping table, and tries to avoid performing partial data writing or reading based on the second storage pool as much as possible, thereby effectively alleviating the problems such as write amplification and poor quality of service. Thus, the cost of hardware of the storage system can be reduced while ensuring the demands for data storage.

The embodiments of the apparatus described above are merely illustrative, wherein the units described as separate parts may be or may not be physically separated, the parts shown as units may be or may not be physical units, i.e., they can be located in one place, or distributed in a plurality of network units. One can select some or all the modules according to actual needs to achieve the solution of the present embodiment. Those having ordinary skill in the art can understand and implement the solution without involving any inventive effort.

From the above depictions of the embodiments it will be clear to a person skilled in the art that the embodiments may be implemented by means of software plus a necessary general-purpose hardware platform, or by means of hardware. With such an understanding in mind, the above-described technical solutions may be in essence or a portion thereof making contribution over the prior art may be embodied in the form of a software product which may be stored on a computer-readable storage medium, such as ROM/RAM, magnetic diskettes, optical disks, etc. that includes instructions for causing a computer device (which may be a personal computer, a server, or a network device, etc.) to perform the methods stated in various embodiments or portions of the embodiments.

Finally, it should be noted that the above-mentioned embodiments are only intended to illustrate the technical solutions of the present disclosure, not to limit the same. While the present disclosure has been described in detail with reference to the foregoing embodiments, those having ordinary skill in the art should appreciate that the technical solutions disclosed in the above-mentioned embodiments can still be modified or some of the technical features can be replaced by equivalents; however, these modifications or substitutions do not cause the essence of corresponding technical solutions to depart from the spirit and scope of the technical solutions of the embodiments of the present disclosure.

According to technical solutions provided by embodiments of the present disclosure, in a case that a host has data to be stored on a solid state drive, a mapping table for managing the mapping relationship between the logical addresses and physical addresses of these data needs to be established. Upon storage, the logical addresses of data to be processed may be first stored into the first access unit in the first storage pool; in a case that the data amount of the logical addresses in the first storage pool meets a requirement (e.g., meets the requirement that the data amount of the logical addresses in the first storage pool is an integer multiple of a data capacity of the second access units in the second storage pool), the logical addresses in the plurality of first access units may be dumped to at least one second access unit. Since the density of flash memory cells in the second storage pool is greater than that in the first storage pool, i.e., the first access unit in the first storage pool has a smaller access unit and a mapping table, when writing or reading of data is performed, the writing or reading may be implemented based on the first storage pool, whereas the second storage block in the second storage pool supports a larger access unit and a larger mapping table, and tries to avoid performing partial data writing or reading based on the second storage pool as much as possible, thereby effectively alleviating the problems such as write amplification and poor quality of service. Thus, the cost of hardware of the storage system can be reduced while ensuring the demands for data storage.

What is claimed is:

1. A data processing method, comprising:
   receiving a logical address corresponding to data to be processed;
   storing the logical address into a first storage pool as a first access unit;
   determining a mapping relationship between a physical address of the data to be processed and the logical address, after storing the logical address to the first access unit;
   based on the mapping relationship and a data capacity of the first access unit, generating a first mapping table corresponding to the first access unit;
   combining, according to a data capacity of a second access unit, a plurality of logical addresses of a plurality of first access units into a logic address group and storing the logic address group into a second storage pool as the second access unit so as to process the data based on the second access unit in a case that a quantity of the stored first access units in the first storage pool meets a requirement;
   generating, based on the data capacity of the second access unit, a second mapping table corresponding to the second access unit.

2. The method of claim 1, wherein the storing the logical address into the first storage pool as the first access unit comprises:
   storing the logical address corresponding to the data to be processed to the first access unit;
   determining a sequential stream identifier of the logical address and a first unit order of the first access units;
   forming the plurality of first access units into a first logical block based on the first unit order; and
   storing a plurality of first logical blocks into the first storage pool.

3. The method of claim 1, wherein the combining the plurality of first access units into the logic address group and storing the logic address group into the second storage pool as the second access unit so as to process the data based on the second access unit in the case that the quantity of the stored first access units in the first storage pool meets the requirement, comprises:
   if a data amount of the logical addresses in the first storage pool is greater than a first threshold; or if a data amount of the first access units is an integer multiple of the data capacity of one of the second access units,
   combining a plurality of first access units into a logical address group and storing the logical address group into the second storage pool as the second access unit so as to process data based on the second access unit.

4. The method of claim 2, wherein the combining the plurality of first access units into the logical address group and storing the logical address group into the second storage pool as the second access unit comprises:
   sequentially combining the logical addresses into the logical address group according to the sequential stream identifiers of the logical addresses in the first access units and taking the logical address group as the second access unit; and
   storing a second logical block constituted by the second access unit into in the second storage pool.

5. The method of claim 4, wherein the sequentially combining the logical addresses into the logical address group according to the sequential stream identifiers of the logical addresses in the first access unit and taking the logical address group as the second access unit comprises:
   if a plurality of first access units are respectively stored in a plurality of first logical blocks, respectively obtaining the sequential stream identifiers of the logical addresses in the plurality of first logical units;

grouping and combining the logical addresses according to the data capacity of the second access unit based on an order of the sequential stream identifiers; and generating the second access unit.

6. The method of claim 4, further comprising:

after storing the second logical block constituted by the second access unit into in the second storage pool, determining a plurality of first mapping tables corresponding to the plurality of first access units for combining the second access unit;

deleting the plurality of first mapping tables from the first storage pool; and generating the second mapping table corresponding to the second access unit based on the mapping relationship contained in the plurality of first mapping tables.

7. The method of claim 6, wherein the deleting the plurality of first mapping tables from the first storage pool comprises:

determining a first logical block marked as a deleted state and the corresponding plurality of first mapping tables; and determining a recoverable first logical block in the first storage pool according to the first logical block marked as the deleted state and the corresponding plurality of first mapping tables and performing a garbage collection on the recoverable first logical block so as to delete the plurality of first mapping tables from the first storage pool.

8. The method of claim 1, further comprising:

if a data amount of the logical addresses in the first storage pool is smaller than the data capacity of the second access unit, waiting for the host to send a logical address corresponding to new data to be processed.

9. The method of claim 1, wherein a flash memory cell density of the second storage pool is greater than that of the first storage pool.

10. A data processing system, comprising:

a first storage pool for; receiving a logical address corresponding to data to be processed; storing the logical address as a first access unit; determining a mapping relationship between a physical address of the data to be processed and the logical address, after storing the logical address to the first access unit; based on the mapping relationship and a data capacity of the first access unit, generating a first mapping table corresponding to the first access unit; combining, according to a data capacity of a second access unit, a plurality of logical addresses of a plurality of first access units into a logic address group and storing the logic address group into a second storage pool as the second access unit in a case that a quantity of the stored first access units meets a requirement; and the second storage pool for storing the second access unit obtained by combining logical addresses in the plurality of first access units and processing data based on the second access unit, and generating, based on the data capacity of the second access unit, a second mapping table corresponding to the second access unit.

11. An electronic device, comprising: a memory and a processor;

the memory comprises: a non-solid state drive and a solid state drive, wherein the non-solid state drive stores a data processing program, and the solid state drive is configured to store data to be processed;

the processor is coupled to the memory and configured to execute the data processing program to:

receive a logical address corresponding to data to be processed sent by a host;

store the logical address into a first storage pool as a first access unit;

determine a mapping relationship between a physical address of the data to be processed and the logical address, after storing the logical address to the first access unit;

based on the mapping relationship and a data capacity of the first access unit, generate a first mapping table corresponding to the first access unit;

combine, according to a data capacity of a second access unit, a plurality of logical addresses of a plurality of first access units into a logic address group and store the logic address group into a second storage pool as the second access unit so as to process the data based on the second access unit in a case that a quantity of the stored first access units in the first storage pool meets a requirement;

generate, based on the data capacity of the second access unit, a second mapping table corresponding to the second access unit.

12. A solid state drive-based storage system, comprising: a host and a solid state drive mounted on the host;

the solid state drive is configured to:

receive a logical address corresponding to data to be processed sent by the host;

store the logical address into a first storage pool as a first access unit;

determine a mapping relationship between a physical address of the data to be processed and the logical address, after storing the logical address to the first access unit;

based on the mapping relationship and a data capacity of the first access unit, generate a first mapping table corresponding to the first access unit;

combine, according to a data capacity of a second access unit, a plurality of logical addresses of a plurality of first access units into a logic address group and store the logic address group into a second storage pool as the second access unit so as to process the data based on the second access unit in a case that a quantity of the stored first access units in the first storage pool meets a requirement;

generate, based on the data capacity of the second access unit, a second mapping table corresponding to the second access unit.

13. A non-transitory computer-readable medium having stored thereon at least one instruction, at least one program, a set of codes or a set of instructions, wherein the at least one instruction, the at least one program, the set of codes or the set of instructions is loaded and executed by a processor to implement the method of claim 1.

14. The non-transitory computer-readable medium of claim 13, wherein the storing the logical address into the first storage pool as the first access unit comprises:

storing the logical address corresponding to the data to be processed to the first access unit;

determining a sequential stream identifier of the logical address and a first unit order of the first access units;

forming the plurality of first access units into a first logical block based on the first unit order; and storing a plurality of first logical blocks into the first storage pool.

15. The non-transitory computer-readable medium of claim 14, further comprising: after the storing the logical address corresponding to the data to be processed to the first access unit,
- determining a mapping relationship between a physical address of the data to be processed and the logical address; and
- based on the mapping relationship, generating a first mapping table corresponding to the first access unit.

16. The non-transitory computer-readable medium of claim 13, wherein the combining the plurality of first access units into the logic address group and storing the logic address group into the second storage pool as the second access unit so as to process the data based on the second access unit in the case that the quantity of the stored first access units in the first storage pool meets the requirement, comprises:
- if a data amount of the logical addresses in the first storage pool is greater than a first threshold; or if a data amount of the first access units is an integer multiple of the data capacity of one of the second access units, combining a plurality of first access units into a logical address group and storing the logical address group into the second storage pool as the second access unit so as to process data based on the second access unit.

17. The non-transitory computer-readable medium of claim 16, wherein the combining the plurality of first access units into the logical address group and storing the logical address group into the second storage pool as the second access unit comprises:
- sequentially combining the logical addresses into the logical address group according to the sequential stream identifiers of the logical addresses in the first access unit and taking the logical address group as the second access unit; and
- storing a second logical block constituted by the second access unit into in the second storage pool.

18. The non-transitory computer-readable medium of claim 17, wherein the sequentially combining the logical addresses into the logical address group according to the sequential stream identifiers of the logical addresses in the first access unit and taking the logical address group as the second access unit comprises:
- if a plurality of first access units are respectively stored in a plurality of first logical blocks, respectively obtaining the sequential stream identifiers of the logical addresses in the plurality of first logical units;
- grouping and combining the logical addresses according to the data capacity of the second access unit based on an order of the sequential stream identifiers; and
- generating the second access unit.

19. The non-transitory computer-readable medium of claim 17, further comprising:
- after storing the second logical block constituted by the second access unit into in the second storage pool,
- determining a plurality of first mapping tables corresponding to the plurality of first access units for combining the second access unit;
- deleting the plurality of first mapping tables from the first storage pool; and
- generating a second mapping table corresponding to the second access unit based on the mapping relationship contained in the plurality of first mapping tables.

* * * * *